M. A. GREEN & J. N. SHAVER.
RESILIENT TIRE.
APPLICATION FILED MAY 19, 1917.
1,264,060.
Patented Apr. 23, 1918.
2 SHEETS—SHEET 1.
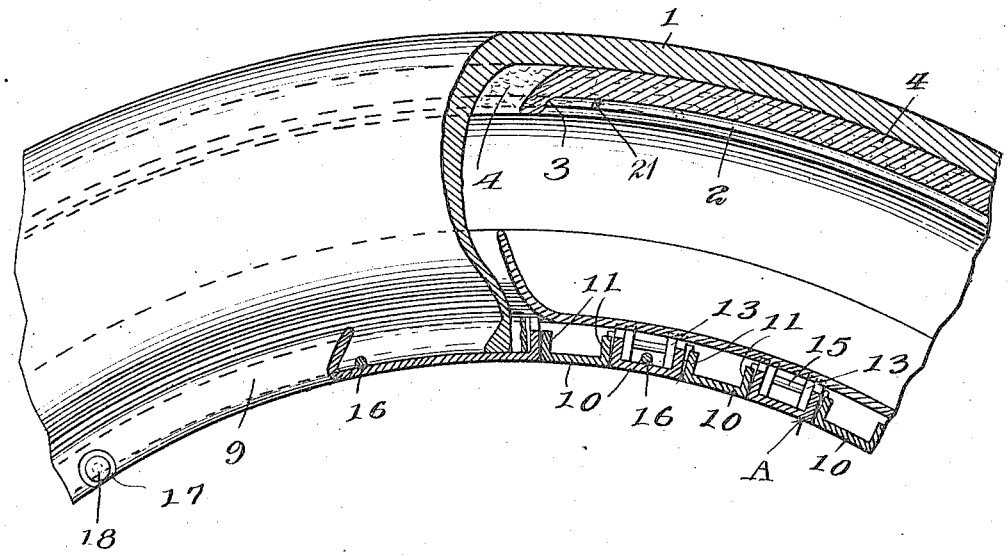
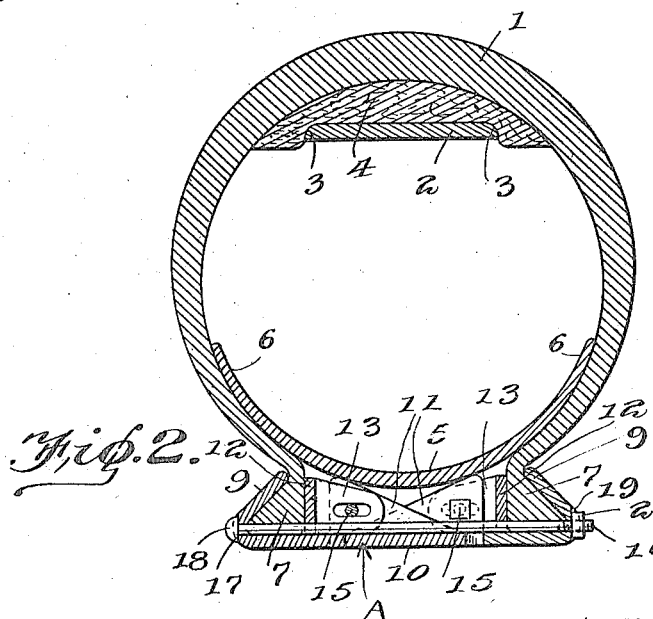
WITNESSES
INVENTORS
M. A. Green
J. N. Shaver
BY
ATTORNEY

M. A. GREEN & J. N. SHAVER.
RESILIENT TIRE.
APPLICATION FILED MAY 19, 1917.

1,264,060.

Patented Apr. 23, 1918.
2 SHEETS—SHEET 2.

WITNESSES

INVENTORS
M. A. Green and
J. N. Shaver
BY Victor J. Evans
ATTORNEY

UNITED STATES PATENT OFFICE.

MORGAN A. GREEN AND JAY N. SHAVER, OF RUPERT, IDAHO.

RESILIENT TIRE.

1,264,060.

Specification of Letters Patent.

Patented Apr. 23, 1918.

Application filed May 19, 1917. Serial No. 169,770.

*To all whom it may concern:*

Be it known that we, MORGAN A. GREEN and JAY N. SHAVER, citizens of the United States, residing at Rupert, in the county of Minidoka and State of Idaho, have invented new and useful Improvements in Resilient Tires, of which the following is a specification.

This invention relates to resilient tires the broad object in view being to produce a tire having practically the same resiliency and shock absorbing properties as the well known pneumatic tire at present in use, but which will eliminate the necessity of using an inflated inner tube and consequently the troubles incident to the use thereof such as punctures and blow-outs.

More specifically stated, the object of the present invention is to produce a tire embodying in conjunction with a resilient or flexible outer casing, novel supporting means for said casing connected therewith for placing the outer casing under any desired tension and also securely clamping and holding the margins of the casing in fixed relation to said rim.

With the above and other objects in view, the invention consists in the novel construction, combination and arrangement of parts, herein fully described, illustrated and claimed.

In the accompanying drawings:—

Figure 1 is a fragmentary side elevation, partly in section, of the improved tire.

Fig. 2 is a cross section through the same on an enlarged scale.

Figure 3:
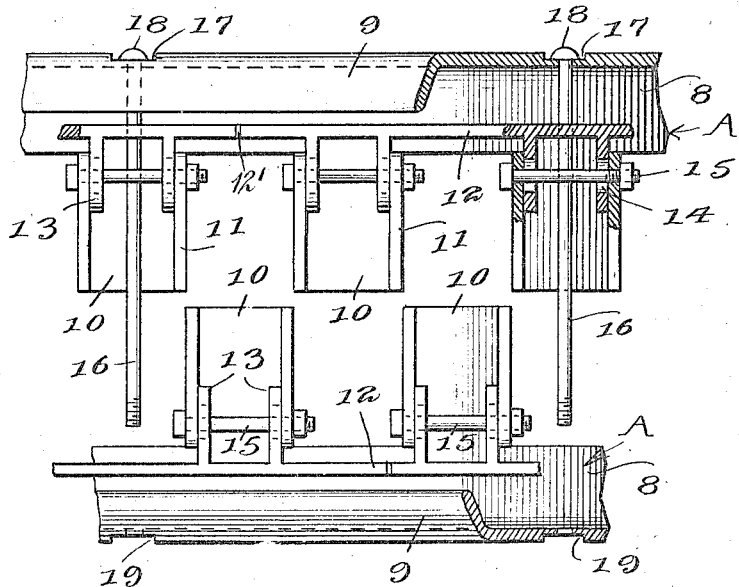
Fig. 3 is a fragmentary plan view, partly in section, of the tire carrying rim, omitting the tire and showing the rim in an expanded condition.
Figure 4:
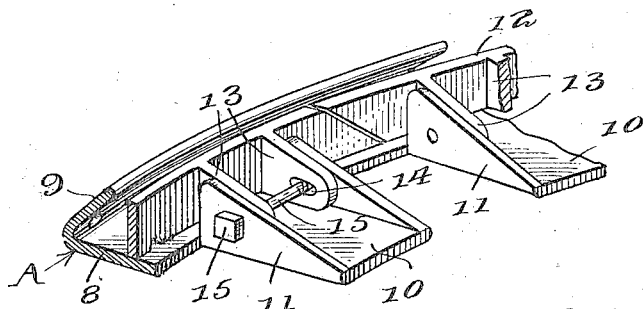
Fig. 4 is a fragmentary perspective view of the same.

The tire contemplated in this invention comprises a resilient or flexible outer casing 1, resembling the ordinary outer casing of a pneumatic tire and composed of rubber or any other flexible material either with or without the use of reinforcing fabric. 2 designates a spring metal tread band the opposite edges of which are rounded as shown at 3 to prevent injuring the casing 1. Between the tread band 2 and the casing 1 is a cushion 4 which is of greater width than the tread band 2 so as to project beyond the edges of said band, as shown in Fig. 2, and prevent contact between said metal tread band and the casing 1. The tread band 2 is continuous or endless but is resilient or capable of bending or flexing when a load is imposed thereon.

5 represents a spring metal base band, the central portion of which is thicker than the marginal portions 6 thereof, the latter being adapted to flex laterally to a limited extent and to yieldingly support the inner portions of the side walls of the tire as clearly shown in Fig. 2. The base band 5 is of sufficient transverse extent to impart the necessary rotundity in cross section to the casing 1. Said casing is provided along the side edges or margins thereof with the usual lips or beads 7.

The tire carrying rim designated generally at A comprises two outer endless annular sections 8, each section being formed along its outer edge with a rim flange 9 under which the adjacent lip or bead 7 of the casing 1 fits as shown in Fig. 2. In conjunction with each of the rim sections 8, an annular tire clamping section 12 is employed, the latter being formed with inwardly extending wedge shaped tongues 13. The tongues 13 are formed with slots 14 to receive bolts 15 which pass through holes in the wedge shaped flanges 11 of inwardly projecting tongues 10 on each rim section 8. The construction just referred to provides for adjusting the clamping sections 12 inwardly or outwardly so that when the rim sections 8 are drawn inwardly, the beads 7 of the tire casing, also clamp between the flanges 9 of the rim sections 8 and the annular clamping rings or sections 12. Simultaneously the wedge-like clamping members 10 will engage the convex surface of the base band 5 and securely hold the latter in a fixed position and relation to the remainder of the rim. The members 12 may be transversely split as shown at 12'.

At suitable intervals bolts 16 are inserted through the sections 8 of the rim, one of the sections 8 being notched or countersunk as shown at 17 to receive the heads 18 of the bolts, and the other section being notched or countersunk as shown at 19 to receive the nuts 20 threaded on said bolts.

After the outer casing has been fitted to the sections of the rim and the clamps 10 have been adjusted to lie at the proper distance from the flanges 9, the bolts 16 are tightened so as to draw the outer sections 8 of the rim toward each other. In this operation, the clencher beads of the outer casing are firmly clamped between the flanges 9 and the clamping sections 12. Also the clamping members or wedges 10 are caused to bind tightly against the convex surfaces of the base band 5 thereby firmly holding the latter in fixed relation to the rim and effectively supporting said base band against lateral displacement or movement as well as longitudinal creeping. This is an important feature for the reason that the successful operation of any resilient tire depends to a great extent on the absence of lateral or sideswaying of the casing.

The rim hereinabove described answers the purpose of a demountable rim and may be attached to a vehicle wheel in any of the usual or well known ways. If desired the tread band 2 may be split or divided transversely as indicated at 21 to facilitate placing the same in and removing the same from the outer casing.

Any suitable material such as steel or aluminum may be used in the construction of the base band and other parts of the rim hereinabove described.

In view of the foregoing description taken in connection with the accompanying drawings it will now be understood that the tire is susceptible of changes in the form, proportion and minor details of construction, which may be accordingly resorted to without departing from the principle or sacrificing any of the advantages of the invention.

We claim:—

1. A resilient tire embodying a flexible outer casing, means for resiliently supporting the tread portion of said casing, an annular base band contained within said casing and having spring marginal portions, said base band being curved in cross section to conform to the marginal rotundity of the casing and having its convex face described on the arc of a true circle, a rim divided longitudinally into endless sections, means for drawing said sections toward each other, means on said rim sections for detachably clamping the marginal edges of the casing thereto, and wedging means coöperating with the convex face of said base band to engage and hold the latter in fixed relation to the rim.

2. A resilient tire embodying a flexible outer casing, means for resiliently supporting the tread portion of said casing, an annular base band contained within said casing and having spring marginal portions, said base band being curved in cross section to conform to the marginal rotundity of the casing and having its convex face described on the arc of a true circle, a rim divided longitudinally into endless sections, means for drawing said sections toward each other, clamping rings on said rim sections for detachably clamping the marginal edges of the casing thereto, and wedging means cooperating with the convex face of said base band to engage and hold the latter in fixed relation to the rim, said clamping rings having an adjustable relation to said wedging means and being movable into and out of engagement with the marginal portions of the casing.

3. A resilient tire embodying a flexible outer casing, an annular base band contained within said casing and having spring marginal portions, said base band being curved in cross section to conform to the marginal rotundity of the casing and having its convex face described on the arc of a true circle, a rim divided longitudinally into endless sections, wedging means carried by the latter for clamping said base band, means for drawing the rim sections toward each other, tire clamping rings on the sections of the rim for detachably clamping the marginal edges of the casing thereto, and means for resiliently supporting the tread portion of the casing consisting of an annular spring band which of itself is unsupported.

MORGAN A. GREEN.
JAY N. SHAVER.

Copies of this patent may be obtained for five cents each, by addressing the "Commissioner of Patents, Washington, D. C."